United States Patent [19]

Antaki et al.

[11] Patent Number: 4,927,657
[45] Date of Patent: May 22, 1990

[54] REDUCED TARTNESS SALAD DRESSING

[75] Inventors: James M. Antaki, San Leandro; Daniel T. Layne, III, Clayton, both of Calif.

[73] Assignee: The Clorox Company, Oakland, Calif.

[21] Appl. No.: 338,367

[22] Filed: Apr. 13, 1989

[63] Continuation of Ser. No. 49,660, May 12, 1987, abandoned.

[51] Int. Cl.$^5$ ............................................... A23L 1/24
[52] U.S. Cl. .................................... 426/589; 426/601; 426/607; 426/321; 426/330.6; 426/330
[58] Field of Search ............... 426/589, 601, 607, 330, 426/321, 330.6, 321

[56] References Cited

U.S. PATENT DOCUMENTS

| | | | |
|---|---|---|---|
| 3,560,220 | 2/1971 | Bangert | 426/589 |
| 3,955,010 | 5/1976 | Choizianin | 426/605 |
| 4,145,451 | 3/1979 | Oles | 426/589 |
| 4,241,095 | 12/1980 | Shibata et al. | 426/589 |
| 4,299,856 | 11/1981 | Zirbel | 426/589 |
| 4,352,832 | 10/1982 | Wood et al. | 426/589 |
| 4,477,478 | 10/1984 | Tiberio et al. | 426/330.6 |

*Primary Examiner*—Jeanette Hunter
*Attorney, Agent, or Firm*—Burns, Doane, Swecker & Mathis

[57] ABSTRACT

The reduced tartness preservation system disclosed herein at least two edible acids as complete replacement for conventional acid stabilizing systems (such as 100% acetic or latic acid) at standard or high total levels of acid. The edible acids are buffered to an increased pH using one or more edible salts to reduce tartness. Such amounts of sugar may be used to enhance the tartness reduction effect.

38 Claims, No Drawings

REDUCED TARTNESS SALAD DRESSING

This application is a continuation of application Ser. No. 07/049,660, filed May 12, 1987.

It is ancient knowledge to preserve food products with acetic acid and other acids against microbial spoilage. However, it has been recognized within the food industry that a maximum pH of 4.2, and a 2.0% acetic acid level (calculated as glacial acetic acid relative to the total water present in the formula) is required for preservation of salad dressings and similar food items.

In salad dressing products in which tart or sour flavors are desired by consumers (e.g., full calorie Oil and Vinegar, standard Thousand Island, and the like) traditional preservation systems cause no difficulty. However, in milder or dairy product based salad dressings, such as creamy cucumber and buttermilk flavored dressings, the tart flavor imparted by a traditional acetic acid preservation system provides a less desirable product. The tartness imparted to mild or dairy product based salad dressings becomes even more critical in reduced-calorie formulations. Reduced calorie dressings may have similar constituents as full-calorie embodiments. However, the caloric content is reduced by replacement of all or part of the oil of a full-calorie formulation with water. This replacement reduces calories, but also may have the dual effects of altering the taste of the dressing and, often, comprising bacteriological stability.

U.S. Pat. No. 3,955,010, issued May 4, 1976 to C. Chozianin discloses a preservation system in which the amount of edible acid is reduced below the 2% glacial acetic acid equivalent level through the careful restriction of bacterial nutrients in the dressing product.

U.S. Pat. No. 4,145,451, issued Mar. 20, 1979 to J. G. Oles teaches that phosphoric acid may be used as a partial replacement for acetic acid with a reduced acid composition when the pH is very low (i.e., less than 3).

U.S. Pat. No. 4,352,832, issued Oct. 5, 1982 to R. W. Wood et al. discloses dressing products which are bacteriologically stable using acetic acid at from 0.2% to 4.0% by weight of the aqueous phase. Soluble salts of acetic acid and citric acid (i.e., sodium acetate and sodium citrate) at a concentration of 0.4% to 3.0% of the aqueous phase are used to buffer the product to an increased pH.

U.S. Pat. No. 4,477,478, issued Oct. 16, 1984 to Tiberio et al. discloses a preservation system in which fumaric acid partially or completely replaces acetic acid.

It is an object of this invention to provide a salad dressing preservation system which has reduced tartness as compared to traditional preservation systems through the use of a novel combination of edible acids and buffering salts.

It is another object of this invention to provide a novel preservation system having acceptable microbiological stability.

It is an object of this invention to provide a preservation system which is appropriate for reduced calorie, and full-calorie mild or dairy-based dressing products.

It is still another object of this invention to provide organoleptically positive characteristics in a mild, preserved salad dressing product.

BRIEF DESCRIPTION OF THE INVENTION

The reduced tartness preservation system of the instant invention uses one or more edible acids as complete or partial replacement for conventional acid stabilizing systems (such as 100% acetic or lactic acid) at standard or high total levels of acid. The edible acids are buffered to an increased pH using one or more edible salts to reduce tartness. Small amounts of sugar may be used to enhance the tartness reduction effect.

DETAILED DESCRIPTION OF THE INVENTION

The invention herein relates to salad dressings, both reduced calorie (especially formulations in which reduced caloric content is achieved by a reduction of oil content) and full-calorie products.

Traditional salad dressing preservation systems use acetic acid, with or without another edible acid, as a preservative. Edible acid preservation systems such as that presented herein are generally calibrated against a standard, which is represented by glacial acetic acid. Acids are measured as equivalents to glacial acetic acid, and stated as a percentage of glacial acetic acid in the aqueous phase (sometimes called the water or moisture phase) of the formulation. The acetic acid equivalent is that amount of the particular acid or mixture of acids, by weight, required to obtain a titratable acidity equal to that of acetic acid. Thus, 100% acetic acid has a 1.00 acetic acid equivalence; 100% phosphoric acid has a 0.82 equivalence; 100% lactic acid has a 1.55 equivalence; anhydrous citric acid has a 1.08 equivalence; anhydrous malic acid has a 1.13 equivalence; and anhydrous fumaric acid has a 0.98 equivalence. Thus, 100% phosphoric acid is added at 82% by weight of the same level of acetic acid used in a product to obtain an equivalent titratable acidity. The total acidity of a product may be converted to the percentage acidity of the aqueous phase as follows:

$$\% \text{ acidity of aqueous phase} = \frac{\% \text{ total formula acidity}}{\% \text{ product moisture}} \times 100\%.$$

The percentage of acidity in the aqueous phase is fully applicable to either full or reduced calorie formulations.

It is generally recognized that a minimum level of 2.0% acetic acid equivalent in the aqueous phase and a maximum pH of 4.2 is required for preservation of salad dressings and similar items. Some flexibility about these levels is present, however By lowering the pH to about 3.0 or less, the acid can be significantly reduced. Conversely, the pH can be increased up to 4.5 with good stability if large quantities of acid are present. However, lowering the pH or increasing edible acid levels in a dressing product may adversely affect the taste of the dressing. Generally, decreased pH or increased acid levels are perceived to increase the tartness of a dressing formulation.

A preservative system which is to be used in consumer products must provide not only suitable microbiological stability, but must also be palatable. Some preservation systems are perceived as tart. This quality is desirable in many formulations in which a tart or "tangy" quality is preferred. However, milder full-calorie formulations, such as creamy dressings, and reduced-calorie formulations in which the oil content has been reduced, may be perceived as too tart by consumers. The desirability of the subject preservation system in any formulation will depend upon the preferred characteristics of the formulation: where tartness is considered to be a positive characteristic, it may not be necessary or desirable to provide reduced tartness.

Both microbiological activity and flavor depend in part upon (1) the amount of water in a preparation, (2) the percentage of acid relative to total water, (3) the identity of the acid(s) used, and (4) the pH of the product. The percentage of acid relative to the total aqueous phase, as expressed as an equivalent to the acid provided by glacial acetic acid, is somewhat variable but is generally about 2%. Often, a portion of this acid is present in the formulation as naturally occurring acid in the miscellaneous ingredients, or from microbiological preservatives such as sorbic acid. Such acid is included in calculations of the total acid content.

The amount of water in a formulation may be stated conversely as the amount of oil in a formulation. Generally, when the amount of oil in a formulation is decreased, the oil is replaced with water. This is common in, for example, reduced calorie formulations. Generally, the oil/water ratio will be dependent upon the intended caloric content of the product, with reduced oil and increased moisture content in reduced calorie formulas. The increased level of moisture increases the potential for microbiological activity, increasing the demands on the microbiological stabilizing system employed in such formulations. At the same time, there are severe limitations on meeting such demands by increasing the acid level and/or lowering the pH, as such adjustments have a significant effect on the product tartness and taste, the acceptable limits of palatability may be exceeded by such adjustments. The oil/water ratio will also affect the pourability or spoonability of the product, with increased oil content correlating to increased thickness. The oil/water ratio will also affect the "mouth feel" of the product.

Edible oils are well known to those skilled in the art, and may include any of the well known triglyceride oils derived from oil seeds, for example, corn oil, soybean oil, safflower oil, cottonseed oil, etc., or mixtures thereof. The amount of oil present in a salad dressing formulation may vary from about 0% to 90% or more, often from about 0% to 66%. Preferably the amount of oil is between about 40% and about 90% by weight. The moisture content will vary from about 5% to about 90%, preferably from about 5% to about 50% by weight, with from about 30% to 90% for pourable formulations, and about 5% to 65% for spoonable formulations. Low-oil and no-oil formulations are particularly suitable for use with the subject invention.

The identity of the edible acid or acids used will affect the mildness of the formulation. Phosphoric and other edible acids provide enhanced mildness as compared to acetic acid, when each provides a given glacial acetic acid equivalent. The enhanced mildness characteristics of the instant invention are provided in part by the substitutive use of phosphoric, citric, lactic, fumaric, adipic, malic, tartaric, or hydrochloric acids, and mixtures thereof, in whole or partial replacement of acetic acid. Generally, formulations in accordance with the present invention include a combination of acetic acid and phosphoric acid to provide a total equivalent acetic acid level of about 1.1 to about 6.5%, preferably about 1.5% to 2.5%, more preferably about 1.8% to 2.2% glacial acetic acid equivalent based on total water present in the formula. These acids are additionally buffered with novel buffering salts, as described herein.

Tartness perception generally varies with the pH of the product. In general, the lower the pH of an acid solution, the more tart a specific formulation will be perceived to be. The instant invention reduces perceived tartness, in part, by providing buffers which increase the pH of the dressing product and therefore yield enhanced mildness characteristics. Buffers which find use in the subject invention are soluble salts of the edible acids. Sodium, potassium or calcium salts may be used. Particularly, disodium phosphate, sodium acetate, sodium diacetate, sodium tartrate, sodium malate, sodium citrate, sodium fumarate, sodium adipate, and sodium lactate may be used as buffers in accordance with the subject invention. Similarly, calcium gluconate, calcium carbonate, potassium bicarbonate, potassium carbonate, sodium carbonate, sodium potassium tartrate, calcium citrate, dipotassium phosphate, calcium diacetate, and potassium citrate may find use as buffers in accordance with the subject invention. The amount of buffering salt employed is about 0.025 to 5.0%, preferably about 0.05 to 2.5%, more preferably about 0.075 to 1.1% of the total water in the formula, and is selected to buffer the pH of the product to the range of about 3.0 to 4.5, preferably about 3.2 to 4.1, more preferably about 3.2 to 3.9. Other buffers may also be appropriate for use in accordance with the instant invention and will be obvious to those skilled in the art in accordance with the teachings herein.

Salt (sodium chloride) may often be found in salad dressing compositions at about a 2.0% level. In such compositions, it has been discovered that tartness may be further decreased and mildness enhanced in accordance with the subject invention if sodium chloride is present in an amount less than 2.0%, preferably from about 1.40% to about 1.90%, more preferably from about 1.50% to about 1.70%. However, formulations containing either less or more salt may be desirable for flavor, and such formulations are within the spirit and scope of the subject invention.

It is possible to reduce tartness by increasing the perceived sweetness of a formulation. One embodiment of the present invention utilizes the addition of small amounts of sugar, corn syrup, or other nutritive sweeteners to a salad dressing with reduced tartness. Alternatively, a non-nutritive sweetener, such as sodium saccharine or aspertame, may be used.

In addition, small amounts of microbial inhibitor (such as sorbic acid, sodium benzoate, potassium benzoate, and/or potassium sorbate) may be included in the formulation. Other microbial inhibitors may be equally appropriate, and are well-known to the art.

Salad dressings may be pourable, spoonable, or separating. Exemplary of pourable salad dressings utilizing the preservation system of the subject invention are the following:

| Ingredient | Example A Salad Dressing: Reduced Calorie | |
|---|---|---|
| | Weight percent | As a percentage of Formula Water |
| Water | 50–65 | |
| Edible Oil | 15–30 | |
| Antimicrobial preservative | 0.05–5 | |
| Miscellaneous | remainder | |
| Ortho-Phosphoric Acid | 0.25–1.06 | 0.50–1.60 |
| Acetic Acid | 0.10–1.52 | 0.20–2.30 |

-continued

Example A
Salad Dressing:
Reduced Calorie

| Ingredient | Weight percent | As a percentage of Formula Water |
|---|---|---|
| Buffering Salt | 0.03–0.85 | 0.06–1.30 |

Example B
Salad Dressing:
Full Calorie

| Ingredient | Weight percent | As a percentage of Formula Water |
|---|---|---|
| Water | 30–50 | |
| Edible Oil | 30–66 | |
| Antimicrobial preservative | 0.05–5 | |
| Miscellaneous | remainder | |
| Phosphoric Acid | 0.20–0.86 | 0.65–1.70 |
| Acetic Acid | 0.06–1.52 | 0.20–3.00 |
| Buffering Salt | 0.02–0.65 | 0.06–1.30 |

"Miscellaneous" ingredients include edible ingredients such as savory flavors (e.g., MSG, hydrolyzed vegetable protein, inosinates and guanylates); meat and meat flavors (e.g., bacon, bacon flavor); dairy products (e.g., buttermilk, sour cream, blue cheese, whole egg), both liquid and dehydrated; vegetables and vegetable flavors (e.g., bell pepper, pickles, onion), fresh or dehydrated; herbs and spices (e.g., pepper, parsley, dill, thyme, sage, oregano), either fresh or dehydrated; natural or artificial flavors; extracts; emulsifiers (e.g., polysorbate 60, egg yolk); gums and starches (e.g., xahthan, guar, locust bean, carageenan, chemically modified cellulose, natural and chemically modified alginates, chemically modified and pregellantenized starches; flavor preservatives (e.g., EDTA, ascorbic acid, butylated hydroxyanisole, butylated hydroxy toluene, tocopherol); spoilage inhibitors (e.g., sorbic acid, sodium or calcium sorbate, sodium benzoate, or microbial inhibitors derived from fermentation, i.e. Microgard TM (a trademark of Wesman Foods)); and or other edible additives which affect the taste or other characteristics of the dressing product. The amount of antimicrobial preservative may vary, but upper limits will generally be mandated by governmental regulation.

The general methods utilized for formulating a dressing product are well known to those skilled in the art. Generally, one wishing to utilize the dressing preservation system disclosed herein would proceed as follows: Determination of a dressing formula will be based upon desired type, style, and caloric content. Generally, the percentage of water and oil are determined, based in part upon the calorie content to be attained. A suitable level of egg yolk or other emulsifier, if appropriate, is selected to prevent oil separation and impart a creamy texture. Salt and miscellaneous spices are selected to provide the desired flavor. Edible acids are chosen, based on the total moisture present in the balance of the formula, and in accordance with the teachings herein. The respective levels of acetic acid and phosphoric acid, for example, are selected by determining what proportion yields the optimal flavor, yet maximizes microbial stability. The ideal target is a range of 1.5 to 2.4% acid calculated as glacial acetic acid equivalents and based upon the moisture present. However, in low moisture dressing products such as spoonable blue cheese, the total acid may be as high as 6.5% acetic acid equivalent based upon the moisture phase. Generally, it is sufficient to consider only the added water unless significant quantities of moisture is included in the miscellaneous ingredients.

The type or types of acid will vary with the flavor to be achieved. Generally, the proportion of phosphoric acid in the formulation will be increased relative to other acids to achieve a milder profile. Once the appropriate acid levels have been determined, a small amount of buffering salt will be added to adjust the pH upwards to the range of about 3.0 to about 4.5. The exact buffering salt is determined by the desired end taste of the finished dressing. A nutritive or non-nutritive sweetener may be added to further enhance the mild flavor. Finally, a microbial inhibitor such as sorbic acid is added to further inhibit the growth of yeasts and molds.

Conventional processing methods are appropriate for use in accordance with the preservation system disclosed herein. Generally, the water, egg yolk (if present), and all dry ingredients are combined in a loose slurry by applying moderate agitation in a low shear mixer. If a separating dressing is preferred, the oil and acid are added to complete the dressing. If a creamy dressing is to result, the oil is blended in until it is evenly dispersed. The resultant liquid is then pumped through a high shear emulsification device such as a colloid mill until a uniform oil in water emulsion of approximately 5 microns average size is achieved. The acids may be blended in under low shear either immediately before or after the high shear emulsifying step.

While extensive exemplification is given herein pertaining to salad dressing products, the invention is not limited to such dressings as defined by the federal standards of identity. The dressing products of this invention may be pourable or semisolid, emulsified or nonemulsified, they may contain oil or be oilless as that term is generally understood in food technology The food products of this invention include, but are not limited to, salad dressings as that term is broadly understood, that is a salad dressing is any liquid or semisolid cooked or uncooked food which may be used as a dressing for salad. Salad dressing as used herein is understood to include but is not limited to, mayonnaise, two-phase Italian dressing, oil-free dressing, French dressing, cucumber dressing, Blue cheese dressing, creamy Italian dressing, sour cream and bacon dressing, and imitations thereof, including those for which Federal standards have and have not been adopted. Salad dressings may be full-calorie, or reduced-calorie formulations. Sandwich spreads utilizing a mayonnaise or salad dressing base are also within the scope of the present invention.

EXPERIMENTAL

Taste and the perception of tartness is somewhat subjective. Nonetheless, using taste-testing data and expert panels, the relative tartness of two or more samples can be determined. Samples were taste tested by a trained expert panel. Panelists were given a twelve point scale, with the points describing varying levels of tartness from imperceptible to extreme. These points were further divided such that a range of scores from 0 to 60 was obtained. A score of 0 represents imperceptible tartness, and 60 represents extreme tartness.

In a first test, panelists were asked to rate variously buffered salad dressings and an unbuffered version of the dressing. All samples were equivalent, including type and percentage of acid combination present. Only one acid combination was tested within a block. The test design was an incomplete block design with a reference. Each panelist in an incomplete block was given the unbuffered sample and two additional, buffered, samples for testing. Each pair of treatments appeared a minimum of four times in each block. The data was analyzed according to the method of M. C. Gacula, *Journal of Food Science* (1978) 43:1461–1466.

When only two samples were compared, the scoring and rating methods remained the same, but there was no buffer comparison.

In a second taste test, the same methodology and rating scale were used to rate salad dressings containing different acid combinations relative to each other. In all cases the salad dressings were otherwise equal. Each sample contained similar amounts of acid, calculated as a glacial acetic acid equivalent, and the same buffer. Similar pH levels were obtained. The test design was a simple incomplete block design after the method of Cochran and Cox, *Experimental Designs* (1957), 2nd edition, 439–482.

Each sample which was tested for yeast and mold resistance underwent the following microbial challenge: Duplicate 100 gram aliquots of each sample were inoculated with composite yeast and mold species. The composite yeast and mold consisted of *Hansenula anomola, Sacchromyces baillii, Aspergillus niger,* and *Aspergillus sp.* The level of inoculum was a minimum of $1 \times 10^3$ each of yeast and mold per gram of aliquot. Samples were incubated at 22° C. All samples were then plated on antibiotic selective potato dextrose agar and stored at 22° C. for an additional five days. The samples were evaluated for the presence of growth at 0, 2, and 4 weeks.

EXAMPLE 1

A salad dressing having the composition, by formula weight percent,

| Ingredient | Formula percent, by weight |
| --- | --- |
| Soybean oil | 52.0 |
| Water | 35.0 |
| Miscellaneous | balance |
| Ortho-Phosphoric Acid | 0.5 |
| Acetic Acid | 0.1 | was formulated, using standard processing techniques. The pH was 3.35. The measured acidity was 2.2%, calibrated as a glacial acetic acid equivalent in the aqueous phase. The amount of each acid present, as a percentage of formula moisture, was: orthophosphoric acid, 1.4%; acetic acid, 0.2%. The percentage of formula moisture was 37%.

EXAMPLE 2

A salad dressing according to the formula of Example 1 was buffered with 0.2 formula percent, by weight, of disodium phosphate. The pH was 3.75.

EXAMPLE 3

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Acetic Acid | 1.0 |
| Sodium acetate, anhyd. | 0.5 | was formulated, using standard processing techniques. The pH was 4.33. The measured acidity was 1.2%, calibrated as a glacial acetic acid equivalent in the aqueous phase. The amount of acetic used, as a percentage of formula moisture, was 1.63%.

EXAMPLE 4

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Acetic Acid | 1.0 |
| Disodium phosphate | 0.6 | was formulated, using standard processing techniques. The pH was 4.37. The measured acidity was 1.2%, calibrated as a glacial acetic acid equivalent in the aqueous phase. The amount of acetic acid used, as a percentage of formula moisture, was 1.63%. The percent of formula moisture was 61.5%.

EXAMPLE 5

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Ortho-Phosphoric Acid | 0.7 |
| Acetic Acid | 0.3 | was formulated, using standard processing technique 2.71. The measured acidity was 1.3%, calibrated as a glacial acetic acid equivalent in the total formulation. The acetic acid equivalent for the product, as a percentage of formula moisture, was 2.2%. The amount of each acid present, as a percentage of formula moisture, was: ortho-phosphoric acid, 1.1%; acetic acid, 0.5%. The percentage of formula moisture was 61.5%.

EXAMPLE 6

A salad dressing according to the phosphoric/acetic acids formula of Example 5 was buffered with 0.3 formula percent, by weight, of anhydrous sodium acetate. The pH was 3.62.

EXAMPLE 7

A salad dressing according to the phosphoric/acetic acids formula of Example 5 was buffered with 0.6 formula percent, by weight, of anhydrous disodium phosphate. The pH was 3.75.

EXAMPLE 8

A salad dressing according to the phosphoric/acetic acids formula of Example 5 was buffered with 0.5 formula percent, by weight, of sodium malate. The pH was 3.59.

EXAMPLE 9

A salad dressing according to the phosphoric/acetic acids formula of Example 5 was buffered with 0.6 formula percent, by weight, of hydrous sodium citrate. The pH was 3.74.

EXAMPLE 10

A salad dressing according to the phosphoric/acetic acids formula of Example 5 was buffered with 0.7 formula percent, by weight, of sodium lactate. The pH was 3.63.

EXAMPLE 11

A reduced calorie salad dressing having the composition, by formula weight percent,

| Ingredient | Formula percent. by weight |
| --- | --- |
| Water | 60.5 |
| Soybean oil | 24.0 |
| Miscellaneous | balance |
| Acetic Acid | 0.6 |
| Fumaric Acid | 0.5 | was formulated, using standard processing techniques. The pH was 3.38. The measured acidity was 1.3%, calibrated as a glacial acetic acid equivalent in the total formulation. The acetic acid equivalent in the formulation, as a percentage of formula moisture, was 2.1%. The amount of each acid present, as a percentage of formula moisture, was: acetic acid, 1.0%; fumaric acid, 0.9%.

EXAMPLE 12

A salad dressing according to the fumaric/acetic acids formula of Example 11 was buffered with 0.1 formula percent, by weight, of anhydrous sodium acetate. The pH was 3.57.

EXAMPLE 13

A salad dressing according to the fumaric/acetic acids formula of Example 11 was buffered with 0.3 formula percent, by weight, of anhydrous disodium phosphate. The pH was 3.63.

EXAMPLE 14

A salad dressing according to the fumaric/acetic acids formula of Example 11 was buffered with 0.2 formula percent, by weight, of sodium malate. The pH was 3.57.

EXAMPLE 15

A salad dressing according to the fumaric/acetic acids formula of Example 11 was buffered with 0.3 formula percent, by weight, of hydrous sodium citrate. The pH was 3.63.

EXAMPLE 16

A salad dressing according to the phosphoric/acetic acids formula of Example 11 was buffered with 0.3 formula percent, by weight, of sodium lactate. The pH was 3.57.

EXAMPLE 17

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Ortho-Phosphoric Acid | 0.7 |
| Lactic Acid | 0.2 |
| Acetic Acid | 0.1 | was formulated, using standard processing techniques. The pH was 2.73. The measured acidity was 1.3%, calibrated as a glacial acetic acid equivalent in the total formulation. The acetic acid equivalent of the formulation, as a percentage of formula moisture, was 2.2%. The amount of each acid present, as a percentage of formula moisture, was: phosphoric acid, 1.2%; lactic acid, 0.4%; acetic acid, 0.2%. The percentage of formula moisture was 61.5%.

EXAMPLE 18

A salad dressing according to the phosphoric/lactic/acetic acids formula of Example 17 was buffered with 0.4 formula percent, by weight, of anhydrous sodium acetate. The pH was 3.53.

EXAMPLE 19

A salad dressing according to the phosphoric/lactic/acetic acids formula of Example 17 was buffered with percent, by weight, of anhydrous disodium phosphate. The pH was 3.69.

EXAMPLE 20

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Ortho-Phosphoric Acid | 0.7 |
| Acetic Acid | 0.1 |
| Citric Acid, anhyd. | 0.1 | was formulated, using standard processing techniques. The pH was 2.75. The measured acidity was 1.3%, calibrated as a glacial acetic acid equivalent in the total formulation. The acetic acid equivalent of the formulation, as a percentage of formula moisture, was 2.2%. The amount of each acid present, as a percentage of formula moisture, was: phosphoric acid, 1.2%; acetic acid, 0.2%; and citric acid, 0.2%.

EXAMPLE 21

A salad dressing according to the phosphoric/acetic/citric acids formula of Example 20 was buffered with 0.4 formula percent, by weight, of anhydrous sodium acetate. The pH was 3.67.

EXAMPLE 22

A salad dressing according to the phosphoric-/acetic/citric acids formula of Example 17 was buffered with 0.6 formula percent, by weight, of anhydrous disodium phosphate. The pH was 3.73.

EXAMPLE 23

A salad dressing according to the phosphoric-/acetic/citric acids formula of Example 17 was buffered with 0.8 formula percent, by weight, of sodium lactate. The pH was 3.59.

EXAMPLE 24

A reduced calorie salad dressing having the composition, by formula weight percent,

| Ingredient | Formula percent, by weight |
| --- | --- |
| Water | 60.5 |
| Soybean oil | 24.0 |
| Miscellaneous | balance |
| Ortho-Phosphoric Acid | 0.7 |
| Lactic Acid | 0.5 | was formulated, using standard processing techniques. The pH was 2.70. The measured acidity was 1.4%, calibrated as a glacial acetic acid equivalent in the total formulation. The acetic acid equivalent of the product, as a percentage of formula moisture, was 2.3%. The amount of each acid present, as a percentage of formula moisture, was: phosphoric acid, 1.2%; lactic acid, 0.7%. The percentage of formula moisture was 61.5%.

EXAMPLE 25

A salad dressing according to the phosphoric/lactic acids formula of Example 24 was buffered with 0.5 formula percent, by weight, of anhydrous sodium acetate. The pH was 3.57.

EXAMPLE 26

A salad dressing according to the phosphoric/lactic acids formula of Example 24 was buffered with 0.8 formula percent, by weight, of anhydrous disodium phosphate. The pH was 3.75.

Table 1 demonstrates the relative effectiveness of the various acid and buffer combinations in reducing tartness and resisting microbial spoilage. The variables are grouped according to the blocks which were used to perform the tartness taste tests.

Table 2 demonstrates the relative effectiveness of two specific buffers and various acid combinations in reducing tartness.

TABLE 1

| No. | Buffer | pH | Acidity[1] | Tartness Score | Yeast Growth 2 wk. | Yeast Growth 4 wk. | Mold Growth 2 wk. | Mold Growth 4 wk. |
| --- | --- | --- | --- | --- | --- | --- | --- | --- |
| | Conventional Full Calorie Formulations | | | | | | | |
| | *Phosphoric/Acetic Acids* | | | | | | | |
| 1 | Unbuffered | 3.35 | 2.2 | NT | — | +/— | — | — |
| 2 | Disodium phosphate | 3.75 | 2.2 | NT | — | — | — | — |
| | Reduced Calorie Formulations | | | | | | | |
| | *Acetic Acid* | | | | | | | |
| 3 | Sodium acetate | 4.33 | 2.0 | 36 | — | — | — | — |
| 4 | Disodium phosphate | 4.37 | 2.0 | 31 | — | +/— | — | — |
| | *Phosphoric/Acetic Acids* | | | | | | | |
| 5 | Unbuffered | 2.71 | 2.2 | 34.7 | NT | NT | NT | NT |
| 6 | Sodium Acetate | 3.62 | 2.2 | 28.5 | — | — | — | — |
| 7 | Disodium Phosphate | 3.75 | 2.2 | 26.4 | — | +/— | — | — |
| 8 | Sodium Malate | 3.59 | 2.2 | 3.80 | — | — | — | — |
| 9 | Sodium Citrate | 3.74 | 2.2 | 33.5 | — | — | — | — |
| 10 | Sodium Lactate | 3.63 | 2.2 | 33.2 | — | — | — | — |
| | *Acetic/Fumaric Acids* | | | | | | | |
| 11 | Unbuffered | 3.38 | 2.1 | 45.9 | NT | NT | NT | NT |
| 12 | Sodium Acetate | 3.57 | 2.1 | 41.3 | — | — | — | — |
| 13 | Disodium Phosphate | 3.63 | 2.1 | 39.5 | — | — | — | — |
| 14 | Sodium Malate | 3.57 | 2.1 | 45.0 | NT | NT | NT | NT |
| 15 | Sodium Citrate | 3.63 | 2.1 | 41.6 | NT | NT | NT | NT |
| 16 | Sodium Lactate | 3.57 | 2.1 | 40.7 | NT | NT | NT | NT |
| | *Phosphoric/Acetic/Lactic Acids* | | | | | | | |
| 17 | Unbuffered | 2.73 | 2.2 | 36.8 | NT | NT | NT | NT |
| 18 | Sodium Acetate | 3.53 | 2.2 | 37.5 | NT | NT | NT | NT |
| 19 | Disodium Phosphate | 3.69 | 2.2 | 22.2 | — | — | — | — |
| | *Phosphoric/Acetic/Citric Acids* | | | | | | | |
| 20 | Unbuffered | 2.75 | 2.2 | 32.9 | NT | NT | NT | NT |
| 21 | Sodium Acetate | 3.67 | 2.2 | 30.6 | NT | NT | NT | NT |
| 22 | Disodium Phosphate | 3.73 | 2.2 | 20.8 | — | + | — | — |
| 23 | Sodium Lactate | 3.59 | 2.2 | 28.4 | NT | NT | NT | NT |
| | *Phosphoric/Lactic Acids* | | | | | | | |
| 24 | Unbuffered | 2.70 | 2.3 | 38.0 | NT | NT | NT | NT |
| 25 | Sodium Acetate | 3.57 | 2.3 | 29.7 | NT | NT | NT | NT |
| 26 | Disodium Phosphate | 3.75 | 2.3 | 27.2 | — | — | — | — |

[1] = Titratable acidity as a percentage of formula moisture, as glacial acetic acid equivalent.
+ = some growth, one trial only
+/— = some growth, one trial; no growth, one trial
— = no growth observed
NT = not tested

TABLE 2

| Example No. | Acids | % Buffer | Rating |
|---|---|---|---|
| Sodium Acetate Buffer | | | |
| 6 | Phosphoric/Acetic | 0.30 | 31.1 |
| 12 | Acetic/Fumaric | 0.12 | 39.3 |
| 18 | Phosphoric/Acetic/Lactic | 0.35 | 29.4 |
| 21 | Phosphoric/Acetic/Citric | 0.37 | 24.2 |
| 25 | Phosphoric/Lactic | 0.50 | 28.7 |
| Disodium Phosphate Buffer | | | |
| 7 | Phosphoric/Acetic | 0.55 | 20.5 |
| 13 | Acetic/Fumaric | 0.25 | 36.5 |
| 19 | Phosphoric/Acetic/Lactic | 0.62 | 26.9 |
| 22 | Phosphoric/Acetic/Citric | 0.55 | 24.5 |
| 26 | Phosphoric/Lactic | 0.82 | 28.0 |

Although the above description and the claims which are appended hereto describe compositions and methods which are useful as a component of salad dressings, and for preserving salad dressings, in fact, variations and modifications thereof will be obvious to those skilled in the art, and obvious equivalents and alternative embodiments consistent with the scope and content of this application are included herein.

What is claimed is:

1. An improved, reduced tartness salad dressing product which is resistant to bacteriological spoilage, including an edible oil in an amount of between about 0% and 90% by weight; moisture in an amount of between about 5% and 90% by weight; the balance being edible ingredients; and a preservation system comprising at least two edible acids in an amount sufficient to provide a titratable glacial acetic acid equivalent in said salad dressing product of between about 1.1% and about 6.5% by weight of the aqueous phase, and buffering salt sufficient to buffer said dressing product to a pH of from about 3.0 to about 4.5; wherein said edible acids are selected from phosphoric, acetic, fumaric, lactic, citric, adipic, malic, tartaric and hydrochloric, and
wherein the combination of said at least two acids and said pH contributes to low tartness in said salad dressing product.

2. A salad dressing product according to claim 1 wherein said edible oil is present in an amount of between about 0% and 66%.

3. A salad dressing product according to claim 1 wherein said edible oil is present in an amount of between about 40% and 90%.

4. A salad dressing product according to claim 1 wherein said moisture is present in an amount of between about 30% and 90%..

5. A salad dressing product according to claim 1 wherein said moisture is present in an amount of between about 5% and 50%.

6. A salad dressing product according to claim 1 wherein said edible acids provide titratable acid equivalent to that provided by between about 1.5% and 2.5% glacial acetic acid, as a percentage of the moisture phase.

7. A salad dressing product according to claim 6 wherein said edible acids provide titratable acid equivalent to that provided by between about 1.8% and 2.2% glacial acetic acid, as a percentage of the moisture phase.

8. A salad dressing product according to claim 1 wherein said buffering salt is selected from a group consisting of the edible soluble salts of edible acids, and combinations thereof.

9. A salad dressing product according to claim 1 wherein said buffering salt is selected from the group consisting of the edible soluble salts of phosphoric acid, acetic acid, fumaric acid, lactic acid, citric acid, adipic acid, malic acid, tartaric acid, and combinations thereof.

10. A salad dressing product according to claim 1 wherein said buffering salt is selected from the group consisting of sodium acetate, sodium citrate, disodium phosphate, sodium lactate, and combinations thereof.

11. A salad dressing product according to claim 1 wherein said buffering salt is present at a level of from about 0.025% to 5.0% by weight of the aqueous phase.

12. A salad dressing product according to claim 1 wherein said buffering salt is present at a level of from about 0.05% to 2.5% by weight of the aqueous phase.

13. A salad dressing product according to claim 1 wherein said buffering salt is present at a level of from about 0.075% to 1.1% by weight of the aqueous phase.

14. A salad dressing product according to claim 1 further comprising a microbial inhibitor.

15. A salad dressing product according to claim 14 wherein said microbial inhibitor is sorbic acid.

16. A salad dressing product according to claim 1 wherein said pH is from about 3.2 to about 3.9.

17. A salad dressing product according to claim 1 wherein said edible acids are selected from the group consisting of phosphoric acid, acetic acid, lactic acid, citric acid, and combinations thereof, and said buffering salt is selected from the group consisting of sodium acetate, disodium phosphate, and combinations thereof.

18. A salad dressing product according to claim 1 wherein one of said edible acids is acetic acid, and said buffering salt is disodium phosphate.

19. A method for preserving a salad dressing including an edible oil in an amount of between about 0% and 90% by weight; moisture in an amount of between about 5% and 90% by weight; and minor amounts of edible ingredients, the step of providing for the presence therein of a preservation system comprising a mixture of at least two edible acids in an amount sufficient to provide a titratable glacial acetic acid equivalent of between about 1.1% and 6.5% by weight of the aqueous phase, and edible buffering salt sufficient to buffer said dressing product to a pH of from about 3.0 to about 4.5; wherein said edible acids are selected from phosphoric, acetic, fumaric, lactic, citric, adipic, malic, tartaric and hydrochloric.

20. A method according to claim 19 wherein said edible oil is present in an amount of between about 0% and 66%.

21. A method according to claim 19 wherein said edible oil is present in an amount of between about 40% and 90%.

22. A method according to claim 19 wherein said moisture is present in an amount of between 30% and 90%.

23. A method according to claim 19 wherein said moisture is present in an amount of between about 5% and 50%.

24. A method according to claim 19 wherein said edible acids provide titratable acid equivalent to that provided by between about 1.5% and 2.5% glacial acetic acid, as a percentage of the moisture phase.

25. A method according to claim 24 wherein said edible acids provide titratable acid equivalent to that provided by between about 1.8% and 2.2% glacial acetic acid, as a percentage of the moisture phase.

26. A method according to claim 19 wherein said buffering salt is selected from a group consisting of the edible soluble salts of an edible acid, and combinations thereof.

27. A method according to claim 19 wherein said buffering salt is selected from the group consisting of the edible soluble salts of phosphoric acid, acetic acid, fumaric acid, lactic acid, citric acid, adipic acid, malic acid, tartaric acid, and combinations thereof.

28. A method according to claim 19 wherein said buffering salt is selected from the group consisting of sodium acetate, sodium citrate, disodium phosphate, sodium lactate, and combinations thereof.

29. A method according to claim 19 wherein said buffering salt is present at a level of from about 0.025% to 5.0% by weight of the aqueous phase.

30. A method according to claim 19 wherein said buffering salt is present at a level of from about 0.05% to 2.5% by weight of the aqueous phase.

31. A method according to claim 19 wherein said buffering salt is present at a level of from about 0.075% to 1.1% by weight of the aqueous phase.

32. A method according to claim 19 further comprising a microbial inhibitor.

33. A method according to claim 32 wherein said microbial inhibitor is sorbic acid.

34. A method according to claim 19 wherein said edible acids are selected from the group consisting of phosphoric acid, acetic acid, lactic acid, citric acid and combinations thereof, and said buffering salt is selected from the group consisting of sodium acetate, disodium phosphate, and combinations thereof.

35. An improved, reduced tartness salad dressing product which is resistant to bacteriological spoilage, including an edible oil in an amount of between about 0% and 88% by weight; moisture in an amount of between about 5% and 90% by weight; the balance being edible ingredients; and a preservation system comprising a combination of edible acids in an amount sufficient to provide a titratable glacial acetic acid equivalent in said salad dressing product of between about 1.1% and 6.5% by weight of the aqueous phase, and buffering salt sufficient to buffer said dressing product to a pH of from about 3.0 to about 4.5.

36. An improved, reduced tartness salad dressing product which is resistant to bacteriological spoilage including an edible oil in an amount of between 0% and 90% by weight; moisture in an amount of between about 5% and 90% by weight; the balance being edible ingredients; and a preservation system comprising a mixture of acetic acid and phosphoric acid, said acids being present in an amount sufficient to provide a titratable glacial acetic acid equivalent in said salad dressing product of between about 1.1% and 6.5% by weight of the aqueous phase; a buffering salt sufficient to buffer said dressing product to a pH of from about 3.0 to about 4.5; and an antimicrobial preservative present in an amount sufficient to inhibit the growth of yeast and molds.

37. A salad dressing product according to claim 36, wherein the amount of edible oil is between about 15% and about 30% by weight; the amount of moisture is between about 50% and 65% by weight, the amount of phosphoric acid is between about 0.5% and 1.6% by weight of the aqueous phase; the amount of acetic acid is between about 0.2% and about 2.3% by weight of the aqueous phase; the amount of buffering salt is between about 0.03 and about 0.85% by weight; and the amount of antimicrobial preservative is between about 0.05% and about 5% by weight.

38. A salad dressing product according to claim 36, wherein the amount of edible oil is between about 30% and about 66% by weight; the amount of moisture is between about 30% and about 50% by weight; the amount of phosphoric acid is between about 0.65% and about 1.7% by weight of the aqueous phase; the amount of acetic acid is between about 0.2% and about 3.0% by weight of the aqueous phase; the amount of buffering salt is between about 0.06% and about 1.3% by weight; and the amount of antimicrobial preservative is between about 0.05 and about 5% by weight.

* * * * *

UNITED STATES PATENT AND TRADEMARK OFFICE
CERTIFICATE OF CORRECTION

PATENT : 4,927,657

DATED : May 22, 1990

INVENTOR(S) : James M. Antaki, et al.

It is certified that error appears in the above-identified patent and that said Letters Patent is hereby corrected as shown below:

On the title page, in item [57] ABSTRACT, line 6, change "Such" to --Small--;

Column 8, line 48, after "technique", insert --. The pH was--;

Column 10, line 36, after "with" insert --0.6 formula--; and

Columns 11 and 12, line 45 (column 3 of Table 1, line 8), change "3.80" to --38.0--.

Signed and Sealed this

Thirteenth Day of June, 1995

Attest:

BRUCE LEHMAN

Attesting Officer     Commissioner of Patents and Trademarks